United States Patent [19]
Edwards

[11] Patent Number: 5,251,494
[45] Date of Patent: Oct. 12, 1993

[54] LIGHT-WEIGHT, DIRECT FIXING DEVICE FOR HANDLEBAR STEM

[76] Inventor: Craig H. Edwards, 3765 Honolulu Ave., La Crescenta, Calif. 91214

[21] Appl. No.: 947,160

[22] Filed: Sep. 18, 1992

[51] Int. Cl.5 .................................. B62K 21/12
[52] U.S. Cl. ........................... 74/551.1; 280/279
[58] Field of Search .................. 280/278–279; 74/551.1, 551.3; 403/374, 370, 104, 248; 411/55, 60, 79, 80

[56] References Cited

U.S. PATENT DOCUMENTS 2,280,662  4/1942  Pawsat ................................ 403/370
4,108,461  8/1978  Hopper ............................... 280/279
5,197,349  3/1993  Herman .............................. 403/374

FOREIGN PATENT DOCUMENTS 0265126  2/1989  Fed. Rep. of Germany ..... 74/551.1
2420747  11/1979  France ............................... 74/551.1

Primary Examiner—Margaret A. Focarino
Assistant Examiner—Victor E. Johnson

[57] ABSTRACT

A simple, direct stem fixing device of minimal weight and material. The stem fixing device utilizes an expansion nut and a fixing bolt which connects the expansion unit to the stem. The fixing bolt connects to the stem by a mount set within the lower portion of the vertical tube, thereby minimizing the necessary length and weight of the fixing bolt. Alternate embodiments of this invention also allow the upper end of the vertical tube to be permanently closed, and provide a separating bolt to free the expansion nuts from its tightened position.

7 Claims, 6 Drawing Sheets

LIGHT-WEIGHT, DIRECT FIXING DEVICE FOR HANDLEBAR STEM

BACKGROUND

1. Field of the Invention

This invention relates to a stem of a bicycle or the like, and more particularly to a stem having a fixing device.

2. Background Description of the Prior Art

The handlebars of a bicycle are generally mounted to the frame by means of a stem having a vertical tube housed telescopically inside, and mounted to, the fork tube.

A. Conventional Stem Fixing Devices

Conventionally, the vertical tube of the stem is mounted to the fork tube by means of a fixing bolt of considerable length, which at its lower end is threaded into an expanding means, usually a conical nut or wedge nut, corresponding to the lower portion of the vertical tube. The fixing bolt extends upward through the upper end of the vertical tube, where it has its head. Under these conditions, when the elongate fixing bolt is turned, the expanding means is pulled upward. Where a conical nut is used, the conical nut is pulled upward into the vertical tube, causing the lower portion of the vertical tube to deform and tighten against the inside of the fork tube. Where a wedge nut is used, the wedge nut is pulled against a complementary tapered surface at the lower portion of the vertical tube, causing the wedge nut to be displaced laterally and to tighten against the inside of the fork tube.

As shown by U.S. Pat. No. 4,340,238 (1982), in the prior art it was considered necessary that the fixing bolt extend to the upper end of the vertical tube, and therefore in the prior art the fixing bolt has "a considerable length, slightly greater than that of the handlebar stem . . . which results in considerable weight." This weight is particularly disadvantageous for racing bicycles, in which it is desirable to reduce weight to a minimum.

Because of the desire to reduce to a minimum the weight of racing bicycles, manufacturers have recently begun to fabricate various racing bicycle components, including the stem, from exotic materials such as titanium and carbon fiber. These materials presently are expensive; therefore the required length of the fixing bolt in the conventional design is also disadvantageous because the amount of material required increases the cost of the stem.

An additional disadvantage of prior stem fixing devices utilizing a fixing bolt is that the upper end of the vertical tube must remain open. In some instances this is required because the head of the fixing bolt is retained above, or at, the upper end of the vertical tube. In these instances, the head of the fixing bolt is exposed to foreign matter including perspiration from the cyclist. Often in these instances, the head of the fixing bolt thus develops rust and an unsightly, difficult to clean appearance. In other instances, the head of the fixing bolt is recessed below the upper surface of the vertical tube, which is closed by means of a small, protective cap. In these instance the cap must be removable to allow entry of a tool into the vertical tube to allow tightening and loosening of the fixing bolt. This ca is easily lost after repeated use of the bicycle or during servicing of the stem.

Besides these disadvantages, the need to leave an opening in the upper end of the vertical tube prevents the upper end of the vertical tube from being closed in a manner aesthetically and structurally integrated with the top portion of the vertical tube and with the horizontal tube. This detracts from the sleek, aerodynamic appearance desired of racing bicycles and most other bicycles.

A final disadvantage of the conventional stem fixing device is that through overtightening or long periods of use without cleaning or servicing, the conical or wedge nut may freeze in its position at the lower portion of the vertical tube. The conical or wedge nut then cannot be removed except by means of a large and sudden force upon the head of the fixing bolt, which may damage the fixing bolt or the stem itself.

B. Alternate Stem Fixing Devices

Inventors have created several means of mounting the stem to the fork tube which do not rely upon an elongate fixing bolt. U.S. Pat. No. 4,340,238 (1982), discloses a stem fixing device operating by means of a single split ring surrounding and clamping both the fork tube and the vertical tube of the stem. U.S Pat. No. 5,003,839 to Yang (1991), discloses a stem fixing device operating by means of pistons in the lower portion of the vertical tube, which are pushed out by means of hydraulic pressure to engage the inner surface of the head tube. However, these inventions have not been well-received; they are seldom used and not generally available commercially. The lack of popular acceptance of these inventions is based on all or some combination of the following reasons (possibly there are others): They are as heavy as the conventional design, they are complicated and expensive to manufacture relative to the conventional design, they do not provide long-term secure fastening of the stem to the fork tube and they require hardware in addition to, and modification of, the conventional fork tube or fork mounting apparatus.

OBJECTS AND ADVANTAGES

Accordingly, several objects and advantages of my stem fixing device are:

(a) to provide a long-term and secure means of fastening the stem to the fork tube of a bicycle and the like;

(b) to provide a stem fixing device of less weight and material than conventional devices utilizing the elongate fixing bolt;

(c) to provide a stem fixing device which is relatively simple and inexpensive to manufacture; and (d) to provide a stem fixing device which does not require hardware in addition to, or modification of, the conventional fork tube or fork mounting apparatus.

Additional objects and advantages of alternate embodiments of the present invention are:

(a) to provide a stem which does not require the upper end of the vertical tube to be left open, but which is fully and permanently closed, thereby:

preventing exposure of the stem fixing device to perspiration or other foreign matter likely to cause corrosion or freezing, eliminating the potential for loss of the removable protective cap, and allowing the vertical tube to be closed in a manner which is aesthetically and structurally integrated with the top portion of the vertical tube and with the horizontal tube, thereby enhancing the sleek, aerodynamic appearance of the stem and the bicycle; and (b) to provide a means of forcefully yet gradually freeing the expanding means from its tightened position without risk of damage to the fixing bolt or the stem.

Further additional objects and advantages will become apparent from consideration of the ensuing description and drawings.

SUMMARY

The present invention is directed to the provision of a simple, effective stem fixing device of minimal weight and material. The present invention operates in the conventional manner described above, utilizing an expanding means and a fixing bolt which connects to the stem and the expanding means. In the present invention, the fixing bolt connects to the stem by means of a mount set within the lower portion of the vertical tube, thereby minimizing the necessary length and weight of the fixing bolt. Alternate embodiments of this invention also allow the upper end of the vertical tube to be permanently closed, and provide a means of forcefully yet gradually freeing the expanding means from its tightened position.

DESCRIPTION AND OPERATION OF THE INVENTION

A. The Stem Fixing Device in General

Figure 1:
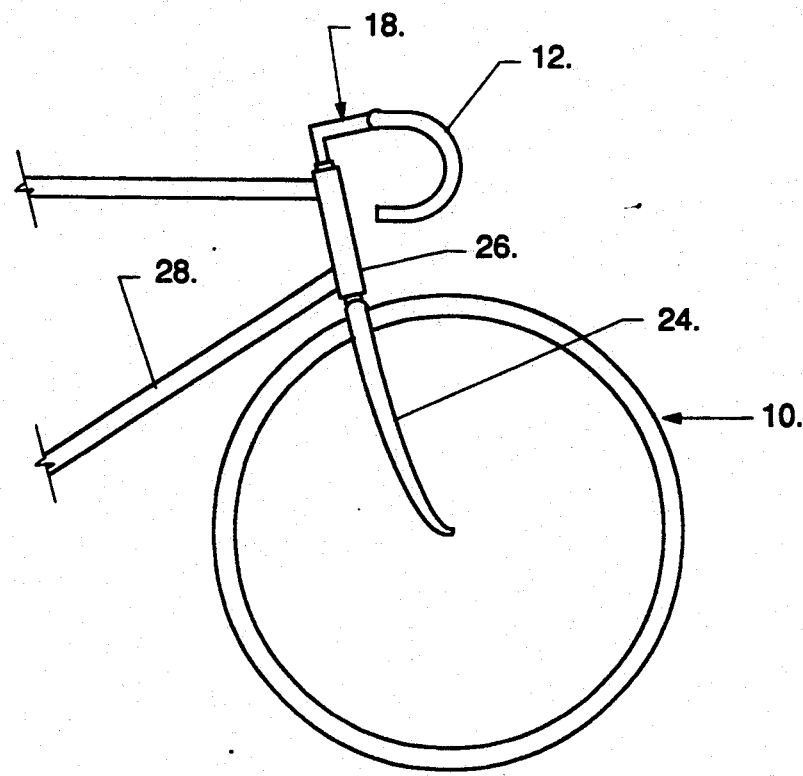
FIGS. 1 and 2 show the location and orientation of the stem with regard to the bicycle and the major components of the stem.
Figure 2:
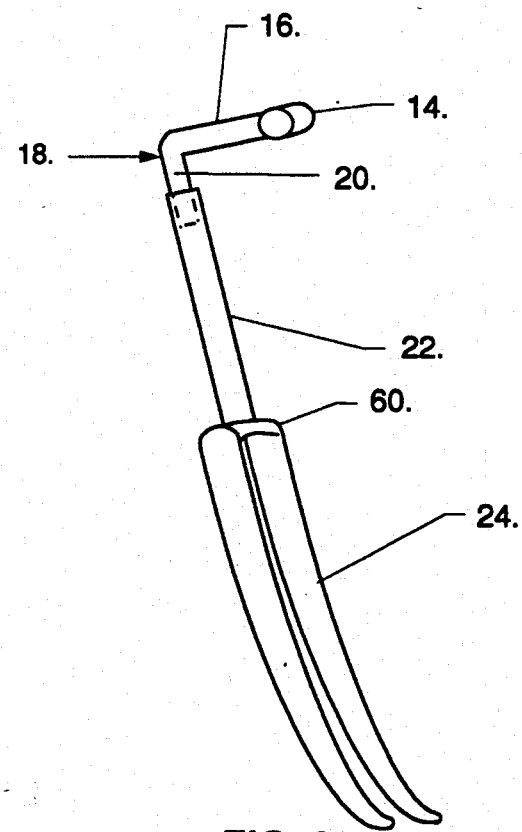

Referring to the drawings, a stem fixing device in accordance with the present invention is provided for fixing a handlebar stem to a fork tube of a bicycle or the like. As illustrated by FIG. 1 and FIG. 2 the handlebar 12 (FIG. 1 only) of the bicycle 10 (FIG. 1 only) is coupled in an opening or handlebar tube 14 (FIG. 2 only) which is attached to the front or most forward end of a horizontal tube 16 (FIG. 2 only) of the stem 18. The back or most rearward end of the horizontal tube 16 (FIG. 2 only) is attached to the side of a vertical tube 20 (FIG. 2 only) of the stem 18, at the top end of the vertical tube 20 (FIG. 2 only). The vertical tube 20 (FIG. 2 only), at its lower end, is received telescopically into the fork tube 22 (FIG. 2 only). The fork tube 22 (FIG. 2 only), which is integrally fixed to a fork 24 of the bicycle 10 (FIG. 1 only), is rotatably received in a head tube 26 (FIG. 1 only) of a frame 28 (FIG. 1 only) of the bicycle 10 (FIG. 1 only) so that the fork 24 can be caused to rotate by the handlebar 12 (FIG. 1 only).

As shown by the specific embodiments discussed below, my stem fixing device is generally comprised as follows: The vertical tube has a gap in its circumference extending downward from a highest point. A lower portion of the vertical tube is defined as the portion of the vertical tube not higher than this highest point of the gap. My invention improves the prior art in that the entire stem fixing device, including the tightening means or fixing bolt, can be located within or below this lower portion of the vertical tube.

Fixed within this lower portion of the vertical tube is a mounting means, which holds either end of a tightening means. The other end of this tightening means is connected to an expanding means, usually a wedge nut or cone nut, located below the lower portion of the vertical tube. When the tightening means is operated, the expanding means is brought upward against the lower portion of the vertical tube, causing a cross-sectional area occupied by at least part of the vertical tube's lower portion and at least part of the expanding means is caused to expand laterally against the inside of the fork tube, thereby fixing the stem in place.

B. The Preferred Embodiment

Figure 3:
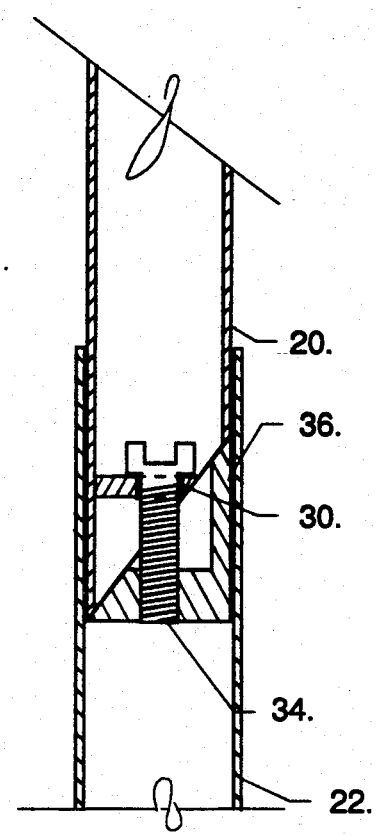
FIG. 3 shows a stem fixing device utilizing a wedge nut where the head of the fixing bolt is mounted within the lower portion of the vertical tube by means of a partially cut-away disc.
Figure 10:
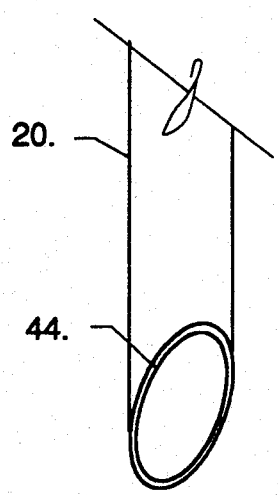
FIG. 10 shows a vertical tube whose lower portion has a diagonal face to complement a wedge nut, as shown in FIGS. 3 and 6.
Figure 12:
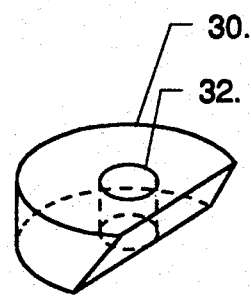
FIG. 12 shows a mounting disc, which is attached to the vertical tube, through which the shaft of the fixing bolt passes, and which supports the head of the fixing bolt, as shown in FIG. 3.
Figure 11:
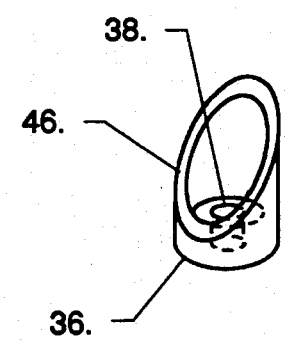
FIG. 11 shows a wedge nut having a diagonal face, and whose bore is threaded to accept the threaded shaft of the fixing bolt, as shown in FIG. 3.

In the preferred embodiment, shown generally by FIG. 3, the gap in the vertical tube's 20 lower portion is formed as if part of the lower portion of the vertical tube 20 were cut away along a diagonal plane, leaving the vertical tube's 20 lower portion with a diagonal face 44 (FIG. 3 and FIG. 10). Welded or otherwise fixed horizontally to the vertical tube 20 within the vertical tube's 20 lower portion is the mounting means, a disc 30 (FIG. 12 and 3) wedge nut 36 (FIG. 3 and FIG. 11) This disc 30 has one edge, which is cut away along the same plane as the diagonal face 44 of the vertical tube's 20 lower portion. This disc 30 contains a central bore 32 to hold the head of the tightening means, a fixing bolt 34, and to allow the shaft of the fixing bolt 34 to pass through with a small amount of freeplay. The fixing bolt 34 extends downward below the vertical tube's 20 lower portion and is threaded into an internally threaded bore 38 in the expanding means, a conventional wedge nut 36 (FIG. 3 and FIG. 11), which has a diagonal face 46 complementing the diagonal face 44 of the vertical tube's 20 lower portion. As the fixing bolt 34 is tightened, the diagonal face 46 of the wedge nut 36 is pulled up along the diagonal face 44 of the vertical tube's 20 lower portion, causing the wedge nut 36 to be displaced laterally relative to this lower portion of the vertical tube 20. Hence, a cross section of the vertical tube's 20 lower portion and the wedge nut 36 expands against the fork tube 22, fixing the stem 18 in place. As the wedge nut 36 is displaced laterally, the small amount of freeplay in the bore 32 of the disc 30 allows the fixing bolt 34 to move laterally with the wedge nut 36.

Figure 4:
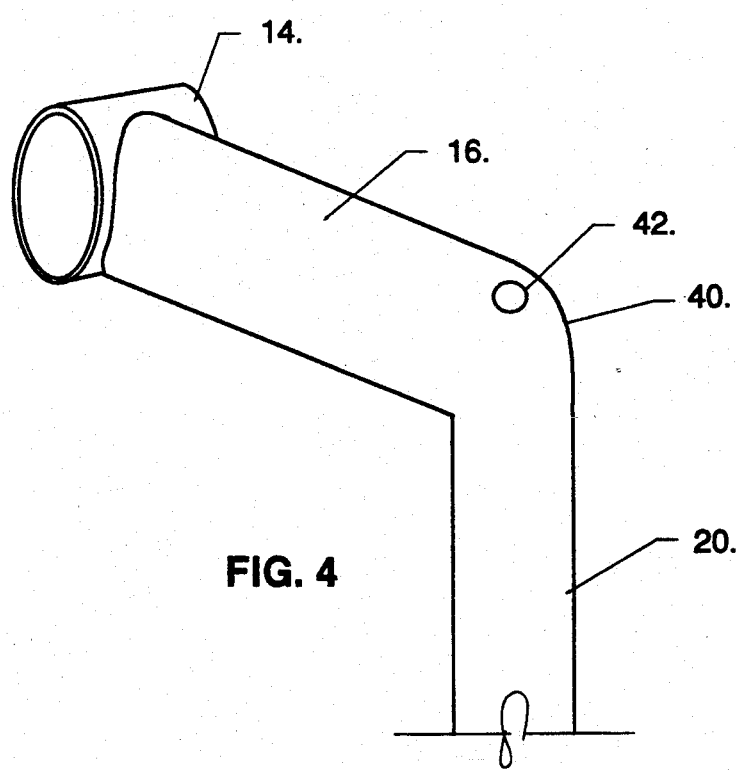
FIG. 4 shows a stem with a small aperture in the joint of the horizontal and vertical tubes to allow access to the fixing bolt.

As FIG. 4 illustrates, the upper end of the vertical tube 20 and the rearward end of the horizontal tube 16 form a joint or elbow 40. This elbow 40 contains a small aperture 42, which may be covered by a small, removable, cap (not shown). When the cap is removed, the aperture 42 allows entry of a tool (not shown) which, extending downward within the vertical tube 20, provides for tightening and loosening of the fixing bolt 34.

C. Additional Embodiments

Figure 5:
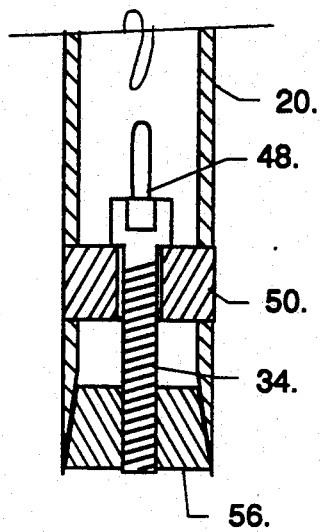
FIG. 5 shows a stem fixing device utilizing a cone nut where the head of the fixing bolt is mounted within the lower portion of the vertical tube by means of a slidable crosspiece.
Figure 13:
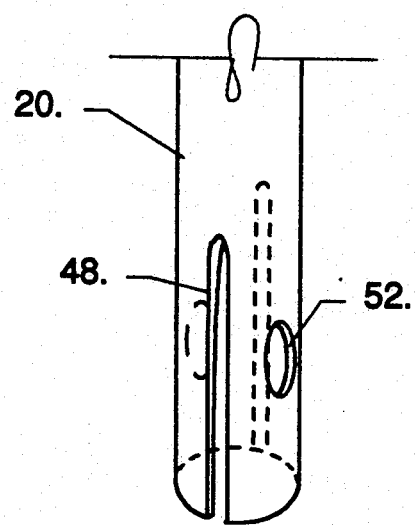
FIG. 13 shows a vertical tube whose lower portion has a vertical slit to accommodate expansion caused by a cone nut, as shown in FIGS. 5, 7 and 8.
Figure 14:
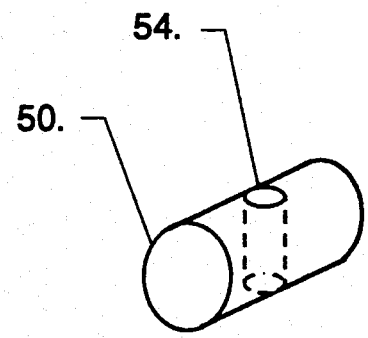
FIG. 14 shows a slidable crosspiece, which is attached to the vertical tube, through which the shaft of the fixing bolt passes, and which supports the head of the fixing bolt, as shown in FIG. 5.
Figure 15:
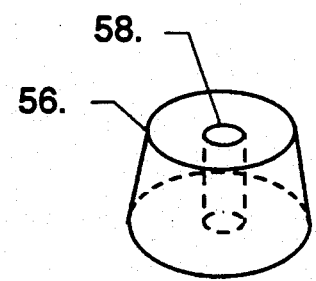
FIG. 15 shows a cone nut whose bore is threaded to accept the threaded shaft of the fixing bolt, as shown in FIG. 5.

Many additional embodiments of my stem fixing device are possible. Some examples follow:

FIG. 5 illustrates a stem fixing device wherein the gap in the circumference of the vertical tube's 20 lower portion consists of a narrow, elongate, vertical slit 48. This vertical slit 48 (FIG. 5 and FIG. 13) allows the vertical tube's 20 lower portion to expand circumferentially. The mounting means comprises a slidable crosspiece 50 (FIG. 5 and FIG. 14), for example a rod or a slat, running across a chord, preferably the diameter, of the vertical tube 20, within the lower portion of the vertical tube 20. On opposing sides of the vertical tube's 20 lower portion are two bores 52 in the vertical tube 20. The ends of the slidable crosspiece 50 are slidably set in these two bores 52. Because the ends of the slidable crosspiece 50 are slidably set in the vertical tube's 20 lower portion, this lower portion is left free to expand, even as it supports the slidable crosspiece 50. Like the disc 30 in the preferred embodiment, the slidable crosspiece 50 contains a central bore 54 to hold the head of the fixing bolt 34, and to allow the shaft of the bolt to pass through with a small amount of freeplay. The expanding means comprises a conventional cone nut 56 (FIG. 5 and FIG. 15) with an internally threaded bore 58 to accept the fixing bolt 34. As the fixing bolt 34 is tightened, the cone nut 56 is pulled up into the vertical tube's 20 lower portion and this lower portion is thereby caused to deform or expand circumferentially against the fork tube 22.

Figure 6:
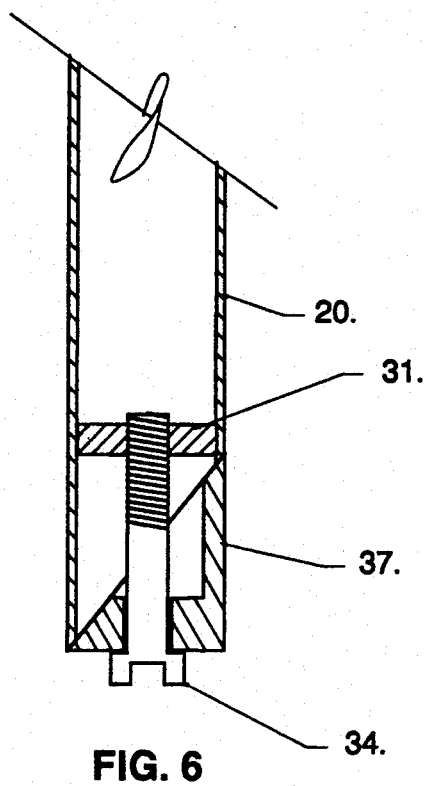
FIG. 6 shows a stem fixing device utilizing a modified wedge nut but where the fixing bolt is mounted from the bottom of the vertical tube.
Figure 7:
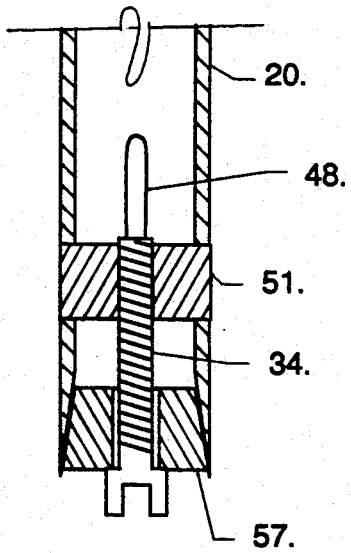
FIG. 7 shows a stem fixing device utilizing a modified cone nut where the fixing bolt is also mounted from the bottom of the vertical tube.
Figure 16:
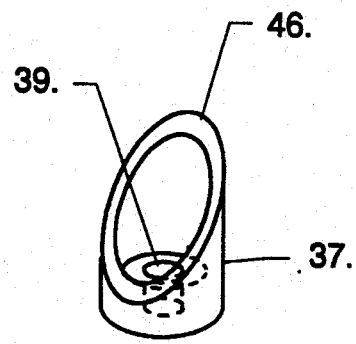
FIG. 16 shows a wedge nut having a diagonal face, and whose bore is enlarged to allow the shaft of the fixing bolt to pass up through it, as shown in FIG. 6.
Figure 17:
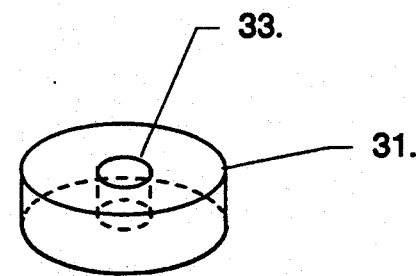
FIG. 17 shows a mounting disc, which is attached to the vertical tube, whose bore is threaded to accept the threaded shaft of the fixing bolt, as shown in FIG. 6.

FIG. 6 illustrates an additional embodiment. This embodiment differs from the first in that the fixing bolt 34 passes upward to the disc 31 rather than downward from the disc 30. The head of the fixing bolt 34 is retained against the flat, bottom surface of the wedge nut 37 (FIG. 6 and FIG. 16). As compared to the preferred embodiment, the diameter of the internally threaded bore 39 of the wedge nut 37 is increased to allow the threaded portion of the fixing bolt 34 to freely pass up through the wedge nut 37 with a small amount of lateral freeplay. The threaded portion of the fixing bolt 34 is engaged by and threaded into the a disc 31, (FIG. 6 and FIG. 1), which has an internally threaded bore 33 to accept the fixing bolt 34. As shown by FIG. 7, this embodiment can also utilize a cone nut 57 (FIG. 7 and FIG. 19) rather than a wedge nut 37; other combinations of mounting means, tightening means, and expanding means are also possible (not shown).

This embodiment is appropriate where, as is the case with most bicycles, the lower end of the fork tube 22, passing through the fork crown 60 (FIG. 2), is left open. Tightening and loosening of the fixing bolt 34 is accomplished by means of a tool (not shown) inserted upwardly into the fork tube 22 from the bottom and engaging the head of the fixing bolt 34. Where the bicycle utilizes a caliper front brake (not shown), with the brake bolt (not shown) passing through the fork tube 22, the front brake generally must be removed to allow loosening or tightening of the fixing bolt 34. Where cantilever or other brakes without a brake bolt passing through the fork tube 22 are utilized, no disassembly of the brake is required.

Figure 8:
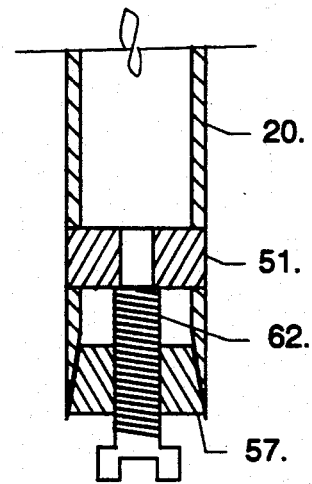
FIG. 8 shows a means of extracting a bottom-mounted cone nut from the vertical tube.
Figure 18:
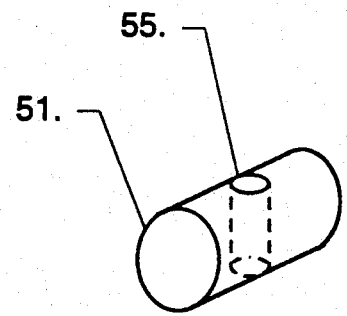
FIG. 18 shows a slidable crosspiece, which is attached to the vertical tube, whose bore is threaded to accept the threaded shaft of the fixing bolt, as shown in FIG. 7, and which serves as the blocking means for the separating bolt, as shown in FIG. 8.
Figure 19:
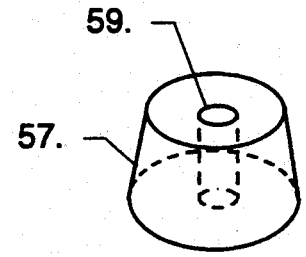
FIG. 19 shows a cone nut whose bore is enlarged to allow the shaft of the fixing bolt to pass up through it, as shown in FIG. 7, but threaded to accept the larger diameter threaded shaft of the separating bolt, as shown in FIG. 8.

In this embodiment, after the expanding means has been tightened into place, it can be forcefully yet gradually freed from this position by means of a separating bolt 62. As FIG. 8 illustrates, after the fixing bolt 34 is removed (assuming the tightening means constitutes a fixing bolt 34, which may not be necessary), the separating bolt 62, which has a diameter slightly larger than the fixing bolt 34 (in this embodiment, as described above, the fixing bolt 34 passes freely through the expanding means), is threaded through the internally threaded bore 59 of the expanding means, here a cone nut 57 (FIG. 8 and FIG. 19). As the separating bolt 62 is tightened, it comes into contact with the bottom surface of a blocking means which is attached to the vertical tube and is above the bore of the cone nut. As shown in FIG. 8, the slidable crosspiece 51 (FIG. 8 and FIG. 18), which functions as the mounting means, also serves as the blocking means. Because of its larger diameter, the separating bolt 62 does not penetrate the bore 55 (FIG. 8 and FIG. 18) of the slidable crosspiece. Therefore, as the separating bolt 62 is tightened further, it forces the expanding means downward, away from the blocking means, eventually causing the expanding means to be freed from its tightened position. This separating bolt mechanism performs in the same fashion when the wedge nut design (as opposed to the cone nut design) is used (not shown).

Figure 9:
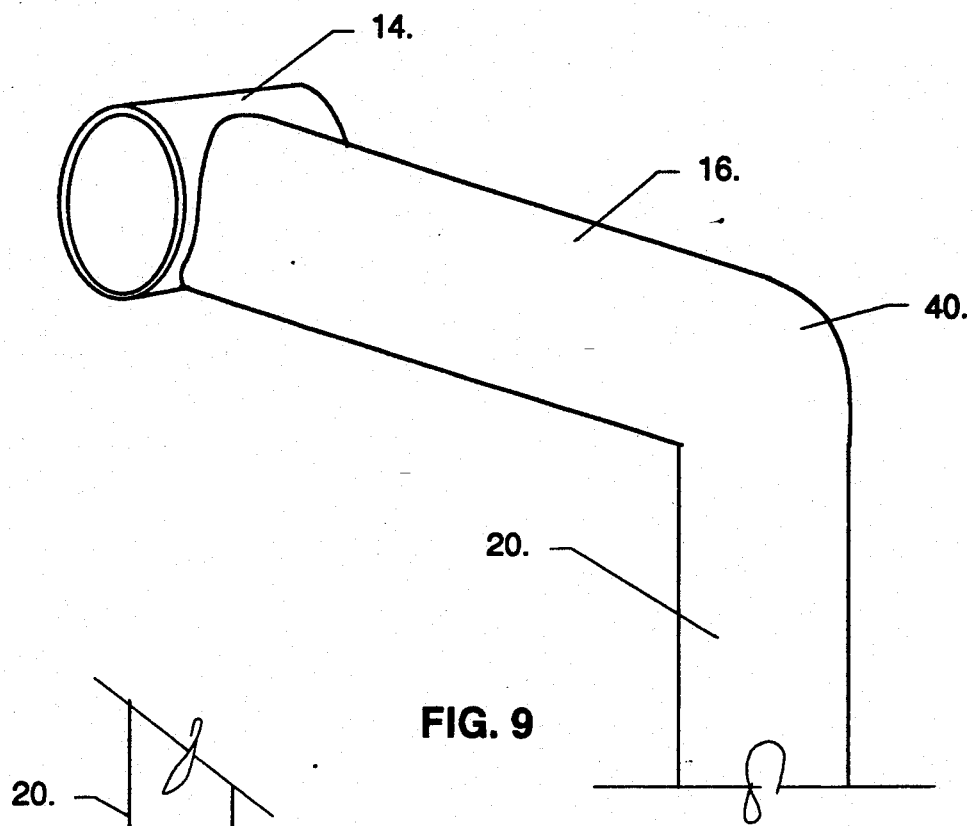
FIG. 9 shows a stem where, as a result of utilizing either of the bottom mounting stem fixing devices shown in FIGS. 5 or 5A, the joint of the horizontal and vertical tubes can be left unperforated.

Because in this second embodiment the fixing bolt 34 or other tightening means is mounted and accessed from the bottom o the fork tube 22, no opening at the top end of the vertical tube 20 is required. As shown by FIG. 9, this allows the upper end of the vertical tube 20 and the rearward end of the horizontal tube 16 to be joined in an elbow 40 or joint whose exterior is permanently continuous and unperforated, so that the vertical tube 20 and the horizontal tube 16 are aesthetically and structurally integrated. The lack of any perforation in this elbow 40 also prevents the rider's perspiration or other foreign matter from entering the vertical tube 20, and especially prevents corrosion and freezing of the stem fixing device. Further, the risk of loss of the conventional, removable cap is eliminated.

SUMMARY, RAMIFICATIONS, AND SCOPE

Thus the reader will see that the stem fixing device disclosed by this invention provides a direct, lightweight and simple means of securing the stem to the fork tube of a bicycle and the like. The reader will also understand that various embodiments of this stem fixing device offer the advantages of preventing exposure of the stem fixing device to perspiration or other foreign matter, allowing the vertical tube to be closed in a manner which is aesthetically and structurally integrated with the top portion of the vertical tube and with the horizontal tube, thereby enhancing the sleek, aerodynamic appearance of the stem and the bicycle, and providing a means of forcefully yet gradually freeing the expanding means from its tightened position without risk of damage to the fixing bolt or the stem.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed. For example, an alternative to the mounting means illustrated by the above described embodiments might be a short, narrow, mounting tube welded or otherwise attached vertically to the side of the vertical tube's lower portion. As another example, the stem fixing device tightened from the bottom might comprise a roughly conical expanding means, with the tightening means provided by threads on the exterior of the cone and on the interior of the lower portion of the vertical tube, so that no mounting means or fixing bolt would be necessary. Accordingly, the scope of the invention should be determined not by the embodiments illustrated, but by the appended claims and their legal equivalents.

I claim:

1. A device for fixing a stem to a fork tube, said stem fixing device comprising:
   a. an approximately vertical tube of said stem being received telescopically into said fork tube,
   b. a gap in the circumference of said vertical tube,
   c. a highest point of said gap,
   d. a lower portion of said vertical tube,
   e. said lower portion defined as the portion of said vertical tube not higher than said highest point of said gap,
   f. an expansion means,
   g. a tightening means capable of being attached to said expansion means and to said vertical tube, which, when attached to said expansion means and to said vertical tube and operated, causes a cross-sectional area occupied by at least a part of said lower portion of said vertical tube and at least a part of said expanding means to expand laterally against said fork tube,
   h. a mounting means for attaching said tightening means to said vertical tube,
   i. said mounting means attached to said vertical tube at a location which is at or below said highest point of said gap.

2. The stem fixing device of claim 1 further including an open lower end of said fork tube and a closed upper end of said vertical tube, wherein said tightening means is assessed through said open lower end of said fork tube.

3. The stem fixing device of claim 1 wherein:
   a. said gap portion of said vertical tube were cutaway along a diagonal plane,
   b. as a result of said gap, said lower portion of said vertical tube has a diagonal face,
   c. said expansion means comprising a wedge nut with an approximately diagonal face, and which wedge nut contains an internally threaded bore,
   d. said tightening means comprising a fixing bolt having a shaft and a head capable of being threaded into said internally threaded bore of said wedge nut,
   e. said mounting means comprising a disc fastened to said lower portion of said vertical tube and containing a bore of diameter slightly larger than the diameter of the shaft of said fixing bolt and smaller than the head of said fixing bolt.

4. The stem fixing device of claim 3 wherein said disc has an edge cut away along approximately the same plane as said diagonal face of said lower portion of said vertical tube, whereby said disc does not protrude beyond said diagonal face of said lower portion of said vertical tube.

5. The stem fixing device of claim 1 wherein:
   a. said gap consists of a narrow, elongate, vertical slit,
   b. said expansion means comprises a cone nut with an internally threaded bore,
   c. said tightening means comprises a fixing bolt having a shaft and a head, said fixing bolt capable of being threaded into said internally threaded bore of said cone nut,
   d. said mounting means comprises a slidable crosspiece having two ends and running across a chord of said vertical tube,
   e. two opposing bores in said vertical tube,
   f. said two ends of said slidable crosspiece slidably set in said two opposing bores,
   g. said slidable crosspiece contains a bore of diameter slightly larger than the diameter of the shaft of said fixing bolt and smaller than the head of said fixing bolt.

6. The stem of claim 2 further including:
   a. a horizontal tube connecting a handlebar to said vertical tube,
   b. an elbow or joint wherein said horizontal tube is joined to said vertical tube,
   c. the exterior of said elbow or joint being continuous and unperforated, thereby preventing moisture or foreign matter from entering said vertical tube and also enhancing the structural and aesthetic quality of said stem.

7. The stem of claim 2 wherein said expansion means has an internally threaded bore, and further including:
   a. a blocking means situated above said bore of said expansion means, and attached to said vertical tube,
   b. a separating bolt capable of being threaded through said internally threaded bore of said expansion means,
   c. said internally threaded bore of said expansion means and said separating bolt both being of sufficient diameter so that when threaded through said expansion means, said separating bolt is incapable of penetrating said blocking means, causing said expansion means to be forced downward and away from said vertical tube, thereby allowing said expansion means to be withdrawn form its tightened position, without risk of damage to the stem or the stem fixing device.

* * * * *